United States Patent [19]

Parker et al.

[11] Patent Number: 4,628,959
[45] Date of Patent: Dec. 16, 1986

[54] VACUUM CHECK VALVE

[75] Inventors: Donald L. Parker, Middletown; Donald L. Heffner, Miamisburg, both of Ohio

[73] Assignee: General Motors Corporation, Detroit, Mich.

[21] Appl. No.: 771,219

[22] Filed: Aug. 30, 1985

[51] Int. Cl.$^4$ .............................................. F16K 15/06
[52] U.S. Cl. ................................ 137/526; 137/533.25; 251/368
[58] Field of Search ..................... 137/526, 533.25; 251/368

[56] References Cited

U.S. PATENT DOCUMENTS 1,470,018 10/1923 Love ........................ 137/533.25 X
2,301,276 11/1942 Gussick ..................... 137/533.25 X
3,086,544 4/1963 Yost ........................... 137/526 X
4,109,464 8/1978 Wickland ........................ 60/397

FOREIGN PATENT DOCUMENTS 218565 5/1957 Australia ..................... 137/533.25

Primary Examiner—Robert G. Nilson
Attorney, Agent, or Firm—D. D. McGraw

[57] ABSTRACT

A vacuum check valve assembly having an axially guided poppet valve and a minimal restriction to air flow. The poppet valve has a seal made of a fluoro-silicone rubber which has excellent non-sticking and non-leaking characteristics over a wide temperature range. The valve assembly may be combined with a fuel vapor adsorbent canister.

5 Claims, 5 Drawing Figures

VACUUM CHECK VALVE

The invention relates to a vacuum check valve and more particularly to such a valve used in the vacuum supply line as a control for a vacuum suspended brake booster supply.

Vacuum check valves of the type disclosed in U.S. Pat. No. 3,086,544, entitled "Check Valve" and issued Apr. 23, 1963, have been used with vacuum suspended power brake boosters for many years. The typical valve construction has a valve element positioned in a valve chamber and made essentially of a washer and a rubber element. The valve is contained and guided within the chamber by the chamber side wall in relation to the outer periphery of the washer. A spring in the valve chamber urges the valve element toward engagement with an annular ridge which forms a valve seat around the point of entry of the inlet conduit into the valve chamber. Since air flow must pass around the valve when it is open, the guiding function of the chamber side wall permits some valve lateral movements so that the valve may not always be completely axially aligned with the valve seat. This loss presented no problem with small leaks that occasionally occur when used with larger engines. It has been found, as vehicle engines have been made smaller to achieve a higher fuel economy, less vacuum is available to operate various vehicle accessories than was the case with most vehicle engines when such check valves began to be used.

It has more recently been common to use such a vacuum check valve in the vacuum conduit between the brake booster and an engine intake manifold to also include a charcoal filter between the manifold and the vacuum check valve as shown in U.S. Pat. No. 4,109,464, entitled "Vapor Guard System" and issued Aug. 29, 1978. The disclosure of this patent shows the same type of vacuum check valve being used as is shown in the earlier noted patent.

The valve assembly embodying the invention herein disclosed and claimed provides for improved air flow so that it is substantially less restrictive to the flow of air from the booster to the vacuum source, which is usually the engine intake manifold, thereby providing a higher level of vacuum within the booster housing than is the case with a more restrictive vacuum check valve. It has been found that in many instances a vacuum check valve embodying the invention will perform sufficiently well to eliminate the need for the activated charcoal canister such as that shown in U.S. Pat. No. 4,109,464. In some instances where it may be desirable to continue to use such a canister in the vacuum system, it is now proposed to incorporate the improved vacuum check valve and the canister into a single housing.

The improved vacuum check valve is a guided poppet valve having a valve stem extending through valve housing guide means. The poppet valve is reinforced for improved sealability. The valve member seal which is engageable with the valve seat is made of a material which substantially eliminates cold weather sticking. It minimizes the formation of ice crystals between the valve seal and the valve seat so that leakage of air past the valve does not normally occur, even in extremely cold weather. The material is also of a type that has improved fuel resistance. By guiding the valve poppet with a valve stem located along the valve poppet axis, greater clearance is able to be maintained between outer periphery of the valve poppet and the adjacent inner wall of the valve housing, permitting much higher air flow rates which are subject to substantially less restriction to flow. At the same time, the valve is maintained in proper guided relation to the valve seat. Other advantages are set forth below.

IN THE DRAWINGS

Figure 1:
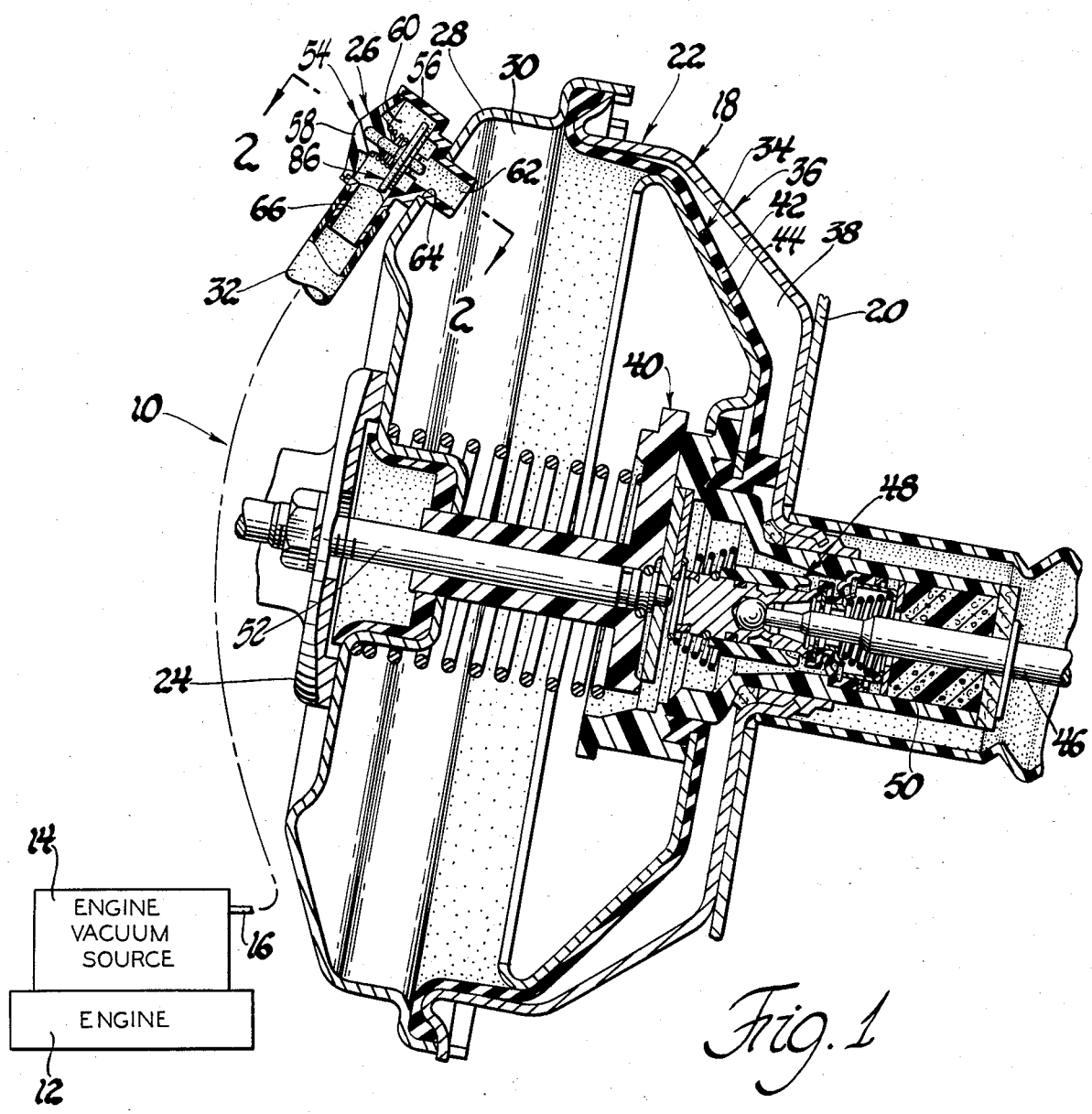
FIG. 1 is a cross-section view with parts broken away and illustrating a system embodying the vacuum check valve of the invention. The system includes a vacuum suspended brake booster and an internal combustion engine, the fuel and air intake of which acts as the vacuum source for the booster.

The system 10 shown in FIG. 1 includes an engine 12 of the internal combustion type commonly used to power motor vehicles. The engine is schematically illustrated as having a fuel and air intake 14, including an engine intake manifold. As is well known, the engine intake manifold is commonly used as a source of vacuum to supply vacuum to certain accessories. A suitable connection 16 is provided to tap into the intake manifold and obtain vacuum therefrom.

A vacuum suspended brake booster and master cylinder assembly 18 is suitably mounted to a portion 20 of a vehicle in which the system is installed so that the assembly 18 may be actuated by the vehicle operator in the usual manner. Assembly 18 includes a servomotor 22 and a master cylinder 24. The servomotor has a vacuum check valve assembly 26 mounted on the servomotor housing front section 28 and opening at one side into the servomotor vacuum chamber 30. The other side of the vacuum check valve assembly 26 is connected by a vacuum conduit 32 to the intake manifold connection 16. This provides a vacuum source for the brake booster servomotor 22.

The servomotor has a power wall 34 dividing the servomotor housing 36, of which housing front section 28 is a part, into the vacuum chamber 30 and a variable pressure chamber 38. Power wall 34 includes a piston 40, a flexible diaphragm 42, and a diaphragm support member 44. The outer periphery of diaphragm 42 is sealingly secured to housing 36 while the piston 40, diaphragm support member 44 and the inner periphery of the diaphragm 42 are linearly moveable.

The servomotor 22 includes an input push rod 46 which is moved by the vehicle operator to control the brake system. Push rod 46 is connected to control valve assembly 48 to control the pressure changes in variable pressure chamber 38. An atmospheric air pressure inlet is provided through the atmospheric air filter 50. The servomotor has an output push rod 52 which is moved by the power wall 34 upon servomotor actuation to actuate the master cylinder assembly 24 and pressurize the brake circuitry of the vehicle.

The servomotor assembly 22 is typical of vacuum suspended servomotors in common usage in this application. An example of the servomotor, with a more detailed description of its operation, is found in U.S. Pat. No. 3,249,021, issued May 3, 1966 and entitled "Power Brake Booster".

Figure 2:
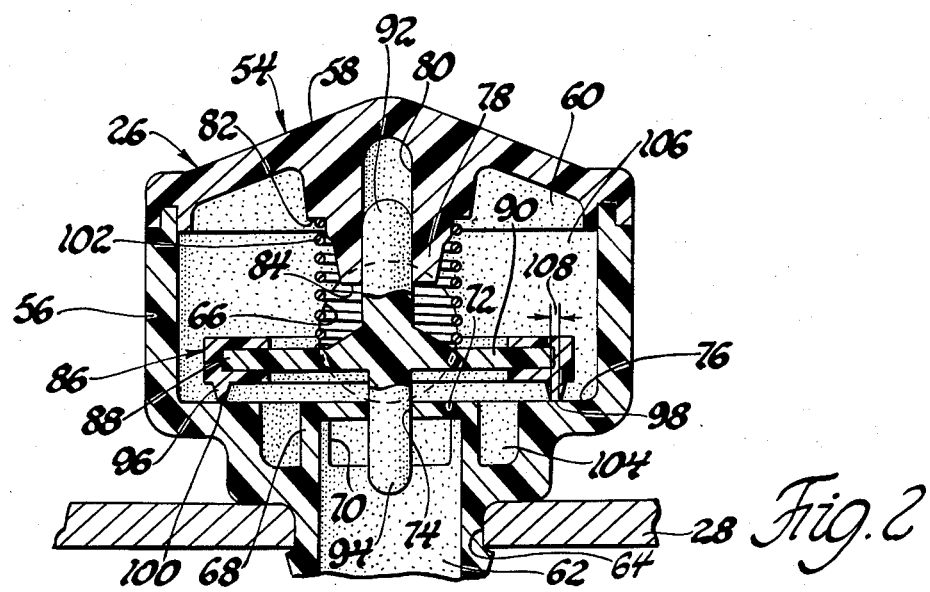
FIG. 2 is a cross-section view, with parts broken away, illustrating the vacuum check valve of FIG. 1 taken in the direction of arrows 2—2 of that figure.

The vacuum check valve assembly 26 of FIG. 1 is illustrated in greater detail in FIG. 2. The assembly includes a housing 54 formed of housing sections 56 and 58. Housing section 58 is sealingly secured to housing section 56 somewhat like a cover and cooperates with housing section 56 to define a valve chamber 60. An inlet 62 is integrally formed with housing section 56. The inlet is constructed to secure the valve assembly to the housing front section 28 through a booster housing front section opening 64 in sealing relation. An outlet 66 is also formed as a part of housing section 56 and is arranged to receive vacuum hose 32 in sealing relation to provide communication between the valve outlet 66 and the engine intake manifold 14. The passages defined by inlet 62 and outlet 66 each connect with the valve chamber 60. Housing section 56 also has a web 68 formed therein over the passage formed by inlet 62, the web being provided with web openings 70 which provide a substantially unrestricted fluid flow connection from the inlet 62 into the valve chamber 60. Web 68 has a center part 72 which is in axial alignment with the inlet 62. An opening 74 is formed axially through the web center part 72 so that the web center part forms a guide for the valve member to be described. An annular valve seat 76 is defined by a surface formed as a part of housing section 56 and generally defining a wall of the valve chamber 60 together with web 68. As can be seen in FIG. 2, the surface of web center part 72 facing toward the main portion of the valve chamber 60 may be a planar extension of the surface defining the annular valve seat 76.

Valve housing section 58 is provided with a boss 78 extending into the valve chamber 60. Boss 78 has a recess opening 80 formed therein and opening into the valve chamber 60. Opening 80 is in axially spaced alignment with the web opening 74. Boss 78 has a shoulder 82 formed on an exterior portion thereof and providing a spring seat for the valve spring to be described. The end 84 of boss 78 terminates in spaced relation to the web center part 72. Recessed opening 80 also acts as a guide for a portion of the valve member to be described.

The check valve member 86 is a poppet type of check valve and is contained within the valve chamber 60. Valve member 86 has a rigid valve member body 88 formed to include a disc-like center section 90 and a valve stem arrangement defined by a first valve stem portion 92 extending axially from one side of the center section 90 and forming a first guided valve portion which is reciprocably received and guided by recessed opening 80 of housing section 58. The stem arrangement includes a second valve stem portion 94 extending axially from the other side of the valve member center section 90 and forming a second guided valve portion. Valve stem portion 94 extends through the web opening 74 for guided reciprocal movement therein. One of the valve stem portions is larger in diameter than the other, and the same is true of the openings 74 and 80, thereby preventing the valve member 86 from being accidentally assembled in the axially reversed position from that desired. For this purpose it is preferred that the valve stem portion 94 and web opening 74 have a smaller diameter than that of the valve stem portion 92 and the recessed opening 80. Since the usual manner of assembly of the valve in the housing would be to first insert stem portion 94 through web opening 74, it is clear that the larger valve stem portion 92 could not be so inserted because web opening 74 is smaller in diameter than that valve stem portion. This effectively prevents misassembly of the valve member in the housing.

Valve member 86 has a valve member seal 96 secured to the peripheral portion of the disc-like center section 90 of the valve body 88. One side of the annular valve member seal 96 has a valve seat-engageable surface 98. In the construction illustrated in FIGS. 1 and 2, seat-engageable surface 98 is the outer end of a circumferentially formed valve member bead 100 which extends axially from the main part of the valve member seal 96 so as to be engageable with the annular valve seat 76 of housing section 56. A compression coil valve spring 102 is received in valve chamber 60 and has one spring end engaging shoulder 82 and the other spring end engaging one side of the valve member body so that the valve member 86 is continually urged toward surface sealing engagement with the annular valve seat 76. Valve spring 102 is so proportioned, and the axial distance between the end 84 of boss 78 relative to the facing surface of the valve member body 88, is such, that the valve member body may move against the force of the spring to fully open the valve by separating the valve member bead 100 from the annular valve seat 76 a sufficient axial distance to provide substantially no flow restriction past the bead and valve seat. At the same time, stem 94 remains guided within the web opening 74 and valve stem 92 moves further into the recessed opening 80. The rigid valve member body 88 extends radially outward so that it is axially aligned with the major portion of the valve member bead 100 to provide reinforcement for the entire valve member seal 96 and axial stability for the valve member bead 100, thereby insuring planar sealing action of the bead 100 with the valve seat 76. The guiding action of openings 74 and 80 on stem portions 94 and 92, respectively, further assure the maintenance of the sealing surface of the valve member seal 96 in parallel planar relation with the valve seat 76 at all times.

When the valve member bead 100 is in sealing engagement with seat 76 as shown in FIG. 2, the valve chamber 60 is separated into a chamber inlet section 104 which is in fluid communication with the inlet 62 so that the entire surface area of the valve member 86 positioned radially inward of the seat engageable surface 98 is exposed to pressure within inlet 62 and therefore the pressure in the vacuum chamber 30 of the booster 22. The chamber outlet section 106 is in full fluid communication with the outlet 66 at all times, and the pressure therein is the pressure being transmitted to the check valve assembly 26 from the engine vacuum source 14 through vacuum hose 32. This pressure also acts on the valve member 86 across the same effective surface as that described immediately above for the inlet pressure. It also acts on the small annular seat engaging surface area 108 which is defined by the area through which surface 98 is in surface engagement with the annular valve seat 76. Therefore the pressure acting on valve member 86 and contained within chamber outlet section 106 acts over a slightly larger effective area than does the inlet pressure acting in the chamber inlet section 104 on the effective area of valve member 86. This difference in effective areas is maintained at a minimal amount by keeping the area of surface 108 to a minimal amount. The minimal contact area is also important in preventing the valve from sticking during extremely cold conditions, as will be further described.

Figure 3:
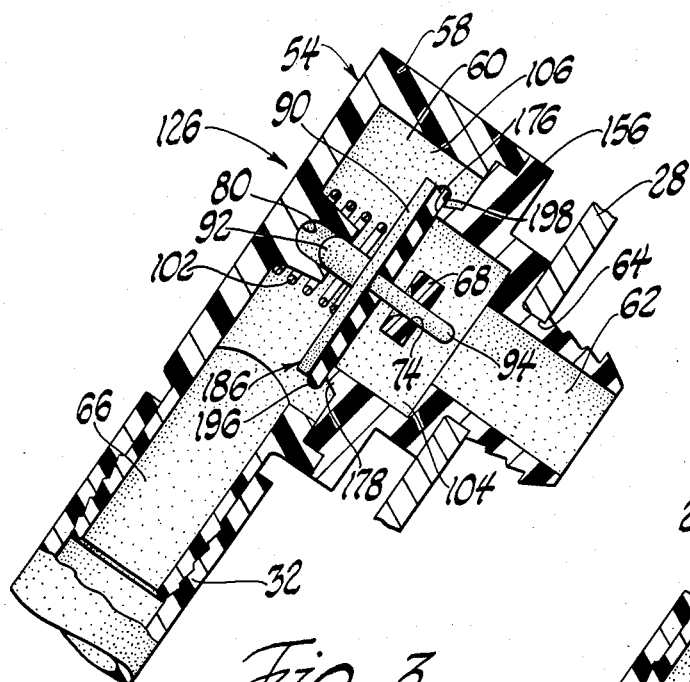
FIG. 3 is a view of a modification of the check valve of FIG. 1, the view being similar to the view of the check valve shown in that Figure, with parts broken away and in section.

The valve assembly 126 shown in FIG. 3 is a modification of the valve assembly 26 shown in FIGS. 1 and 2. Similar reference numerals are used to identify similar parts. The valve member 186 has a somewhat different valve member seal 196. In this instance the seal is provided on one side of the valve member disc-like center section 90 and has a flat surface providing the seat-engageable surface 198. The annular valve seat 176 is formed on a raised bead 178 which is a part of the housing section 156. It should be recognized that the valve member seal 196 may also be formed like the valve member seal 96 of FIGS. 1 and 2 but without the bead 100 thereon. Essentially the construction shown in FIG. 3 has the annular bead formed on the valve housing section rather than on the valve member seal. The valve assembly 126 functions in the same manner as does the valve assembly 26 of FIGS. 1 and 2 as above described.

Figure 4:
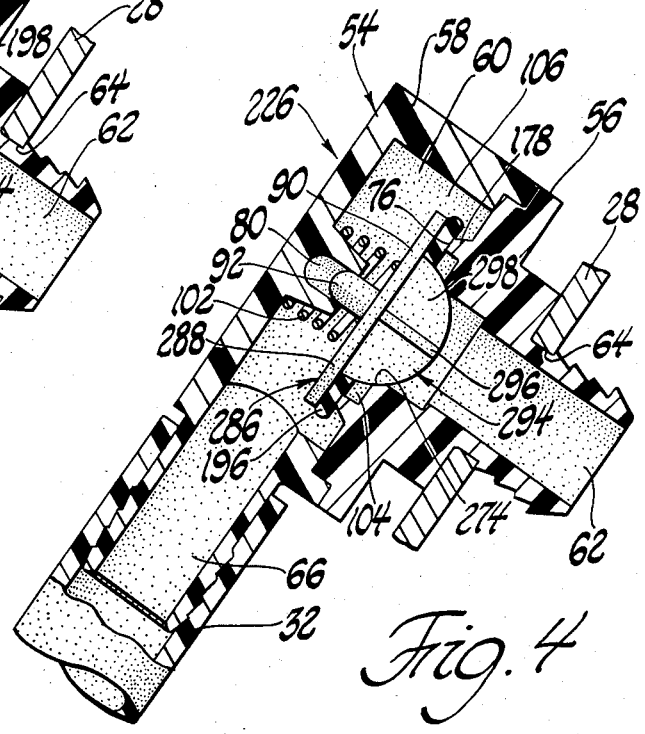
FIG. 4 is a view similar to FIG. 3 showing another modification of the check valve embodying the invention.

The valve assembly 226 of FIG. 4 is another modification of the valve assembly of FIGS. 1 and 2. This assembly is illustrated as having a valve seal and valve seat arrangement generally similar to that of FIG. 3 and forming a part of the valve member 286. However, a slightly different guide arrangement is illustrated. The stem 92 of the valve member 286 extends into recessed opening 80 as before, and valve spring 102 is positioned to act on the valve member 286 as does spring 102 of the earlier described figures. However, the web 68 and the valve stem 94 have been replaced by a centering guide 294 formed on the other side of the valve member body 288 from stem 92. The centering guide 294 is formed with two semi-circular planar sections 296 and 298 intersecting at right angles at the axis of the valve member 286 and positioned so as to prevent the valve member 286 from moving laterally to any extent relative to the point at which inlet 62 opens into the valve chamber inlet section 104. There is no web 68. The construction of the centering guide 294 provides no flow restriction to the flow of fluid into the chamber inlet section 104. When the valve is open it also tends to divide that flow into substantially equal parts so that flow passes all around the valve member 286 into the chamber outlet section 106 and therefore through outlet 66. The stem 92 will continue to guide the valve member in its axial movement. If for any reason the valve member should tend to be cocked so as to move out of axial alignment with the inlet 62, the planar sections 296 and 298 may engage portions of the opening 274 to re-center the valve member in the valve housing so that it is axially aligned with the inlet 62 and the recessed opening 80. Otherwise the assembly of FIG. 4 operates in the same manner as above described for the valve assemblies previously described.

Figure 5:
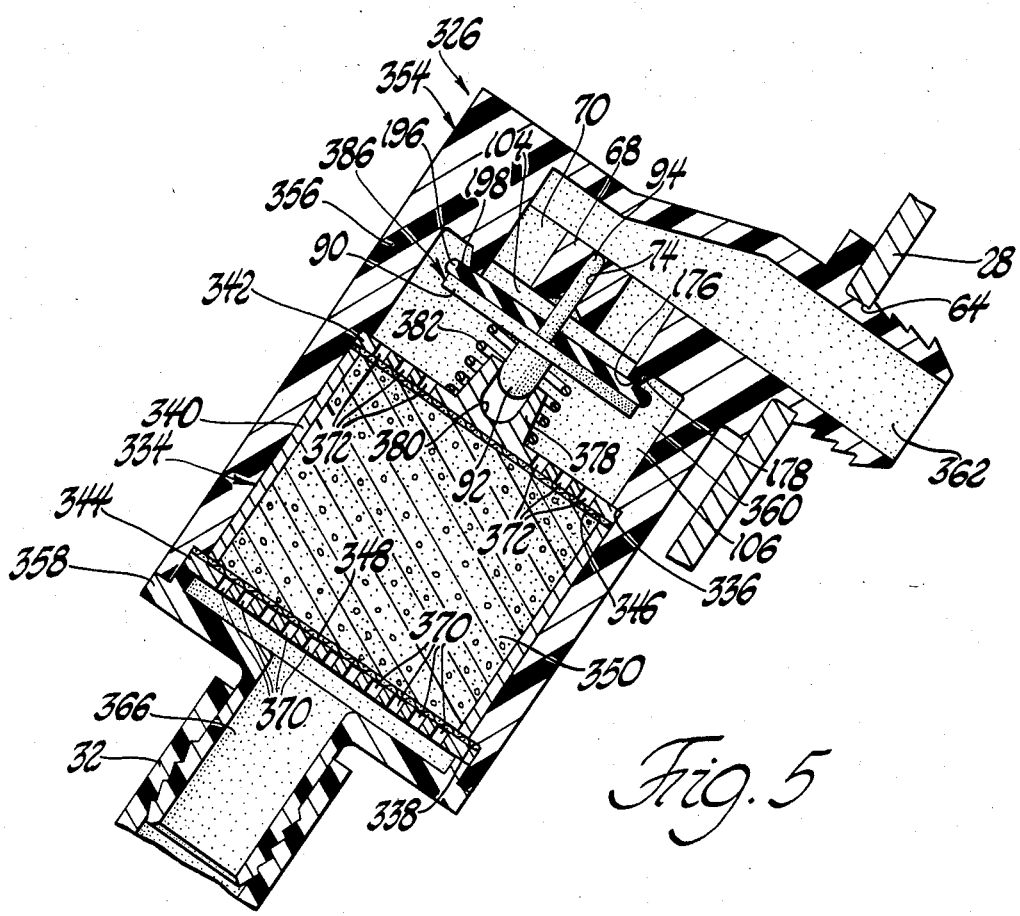
FIG. 5 is another view similar to FIGS. 3 and 4 showing another modification wherein the check valve and an activated charcoal canister arranged in series with the check valve are contained in a common housing and have certain parts in common.

FIG. 5 shows the combination of a check valve of the type described above with a fuel vapor adsorbing canister provided as an integrated unit. The assembly 326 includes a housing 354 formed of housing sections 356 and 358. Housing 354 defines a valve chamber 360, an inlet 362, and an outlet 366. A check valve member 386 is received in the valve chamber 360, and is illustrated as being a check valve member much like the one disclosed above in FIG. 3. It is to be understood that the check valve member may alternatively be constructed as one of those shown in the other figures of the drawings. Similar reference numerals as used in the other drawing figures are used to identify various portions of the check valve member and the housing with which it is associated. A major difference in construction is the provision of a canister 334 in a chamber formed in housing section 356 and joining the valve chamber 360 and providing an extension thereof toward housing section 358. A shoulder 336 is formed as a part of the housing section 356 to effectively separate the valve chamber 360 from the chamber in which canister 334 is contained. Another shoulder 338 is formed near the outer end of the canister chamber housing section 356.

Canister 334 is illustrated as being formed with a cylinder 340, an inner end 342 and an outer end 344. A screen 346 is provided against inner end 342 on the interior side of the canister 334, and another similar screen 348 is similarly provided adjacent the canister outer end 344. The interior of cylinder 340 between screens 346 and 348 contains a suitable material 350 which can trap or adsorb fuel vapor and can release or desorb the vapor. A preferred material is activated charcoal, and is provided in sufficient quantity to be able to contain the amount of fuel vapor which may be trapped therein between filter purging actions without allowing any of the fuel vapor to reach the inlet 362 from the outlet 366, even if the check valve member 386 should malfunction so as not to completely seal when it is supposed to be completely sealed. The housing section 358 is suitably secured to the housing section 356 after the canister 334 has been positioned in place, with the canister inner end 342 seated on shoulder 336 and the canister outer end 344 seated on shoulder 338. The canister may be removed and replaced by removing housing 358 for this purpose. It is noted that the canister outer end 344 has a series of openings 370, and the canister inner end 342 has a similar series of openings 372, which openings permit the flow of air from the vacuum chamber 30 of the booster 22 through the valve assembly and the canister to outlet 366. The openings are to be provided with sufficient total area to present substantially no restriction to such flow.

The canister inner end 342 is also constructed to be a part of the valve assembly 386. For this purpose, it has a boss 378 formed with a recessed opening 380. A valve spring 382 is compressed between the canister inner end 342 and the disc-like center section 90 of the valve member 386, as described in the earlier drawing figures. The valve stem 92 fits within the recessed opening 380 in axially sliding and guided relation, similar to the construction shown in the earlier noted drawings. By this arrangement, the canister inner end 342 also acts as a valve guide and retention member. It is to be understood that the canister inner end 342 may be pre-assembled as a part of the canister 334, or may be separate from the remainder of the canister so that it may be separately inserted in engagement with the valve spring 382 and the valve stem 92 before the remainder of the canister is installed. For this purpose it may fit sufficiently tightly in housing section 356 to be retained therein while the remainder of the canister 354 is removed and replaced.

The valve member seal 96 of the construction shown in FIGS. 1 and 2, and the valve member seals of the other Figures, are preferably molded in place on the valve member body. It has been found that it is also preferable to make the valve member seals from a fluoro-silicone rubber for improved fuel vapor resistance and minimization of cold weather sticking. The material should have a durometer of about 40 to 50 at a standard temperature of 70° F., and should increase in durometer with a decrease in ambient temperature to no more than about 60 to 70 durometer at about minus 20° F. This will not only substantially eliminate cold weather sticking of the valve seal to the valve seat under cold weather conditions, but will also maintain good sealing characteristics throughout the range of temperatures normally encountered in vehicles, such a temperature range being from as high as about 280° F. in the engine compartment in which the valve is normally located to as low as about minus 40° F.

By arranging the valve member so that it is guided and supported axially, greater clearance around the outer periphery of the valve member in relation to the valve housing is permitted so to minimize flow restriction in that area. It is preferred that the annular area defined by the outer periphery of the valve member 86, 186, 286 or 386 and the portion of the valve housing which is radially outward of the valve member outer periphery be at least as great as the effective cross-section area of the inlet port formed by inlet 62. This assures a substantially unrestricted air flow past the outer periphery of the valve member when the valve assembly is open. A considerably greater air flow may be obtained through the valve than has heretofore been the case. This therefore leads to an increase in the size of vacuum hose such as vacuum hose 32, as well as the sizes of the inlet 62 and the outlet 66, to take full advantage of the decrease in restriction to flow in the valve itself. This has resulted in substantially less pressure drop in relation to flow rate, minimizing the amount of time required to reestablish the desired vacuum pressure in the vacuum chamber of the brake booster during or after booster operation, whether or not the canister containing adsorbing material is used. At the same time, the average differential pressure for opening the vacuum check valve is maintained at less than one inch of mercury. Where the average flow restriction at a flow rate of 500 cubic feet per hour of air through the valve has previously been in the range of about 18 to 28 inches of mercury, the valve embodying the invention as shown in FIGS. 1-4 has an average flow restriction at this flow rate of less than 3 inches of mercury. The valve has also minimized the amount of leakage when the valve is supposed to be fully closed. It has been equal to the best of valves in current production at moderately high temperatures. For example, at 212° F., tests have indicated that no leakage has occurred, while on some production units, as much as 20% of the valves will have some leakage at this temperature. It has considerably decreased the valve leakage at cold temperatures, as well as valve sticking under cold temperatures. For example, the valve embodying the invention had no leaks and did not stick at 0° F. The valve embodying the invention also showed dramatic improvement in leakage and potential failure with a pressure differential thereacross as small as 2 inches of mercury and up to 20 inches of mercury, in comparison to various valves used by different manufacturers. Due to the added flow capabilities of the valve with minimal restriction, combined with the improved sealing and anti-sticking characteristics, it has been found that there is usually no need to use a canister of adsorbent material with the valve assembly embodying the invention. Since the adsorbent material is provided to prevent fuel vapor from entering the vacuum chamber of the brake booster, the use of a very dependable valve under all conditions of operation has minimized the likelihood that fuel vapor could pass the valve at any time and enter into the brake booster assembly. In an installation where a fuel vapor adsorbent canister is desirable, the arrangement of FIG. 5 is a preferred embodiment.

The embodiments of the invention in which an exclusive property or privilege is claimed are defined as follows:

1. In a vacuum check valve assembly:
   a housing having
      a first housing section
      and a second housing section,
      said first and second housing sections being secured together to define a valve chamber,
   said housing further having
      an inlet for air flow into said valve chamber and an outlet for air flow out of said valve chamber,
      said outlet being adapted to be connected to a vacuum source such as the intake of an internal combustion engine
      and said inlet being adapted to be connected to a vacuum powered device such as a vacuum suspended power brake booster;
   a poppet type check valve member received in said valve chamber, said check valve member comprising
      a rigid valve member body having
         a disc-like center section,
         a first stem extending axially from one side of said center section and forming a first guided valve portion,
         a second stem extending axially from the other side of said center section and forming a second guided valve portion,
      an annular valve seal secured to the peripheral portion of said disc-like center section of said valve body,
         one side of said annular valve seal having a valve seat-engageable surface;
   said valve housing having
      a recessed opening in one of said housing sections receiving said first guided valve portion therein for guided reciprocal movement,
      a web in the other of said housing sections formed to extend into said valve chamber, said web having a center part in axial alignment with said inlet and with said recessed opening, said web center part having an opening formed axially therethrough and receiving said second guided valve portion therein for guided reciprocal movement,
      an annular valve seat formed as a part of said other housing section and extending about said inlet toward said valve chamber, said annular valve seat being sealingly engageable with said annular valve seal seat-engageable surface;
   one of said valve seal and said valve seat having annular bead means formed thereon for engaging the other of said valve seal and said valve seat in sealing relation with minimal effective contact area;
   and a valve spring in said valve chamber acting on said valve member and continually urging said valve seal toward sealing engagement of said valve seal with said valve seat;
   said rigid valve member body providing reinforcement for said valve seal to insure planar sealing action with said valve seat;
   said valve seal being a rubber-like material having a durometer of about 40 to 50 at about 70° F. and increasing in durometer with a decrease in ambient temperature to no more than about 60 to 70 durometer at about minus 20° F. so as to substantially eliminate cold weather sticking of said valve seal to said valve seat under cold weather conditions while maintaining good sealing characteristics;

said valve spring having a spring rate cooperating with the large effective area of said valve member in relation to the minimal effective contact area of the sealing engagement of said valve seal with said valve seat to permit a low pressure differential acting across said valve member to open said valve member relative to said valve seat and permit flow through said check valve assembly, said low pressure differential being about 1 inch of mercury differential pressure acting across said valve member;

said valve assembly when opening providing an average flow restriction therethrough on the order of about 2 to 4 inches of mercury at an average flow rate of about 500 cubic feet per hour.

2. In a vacuum check valve assembly:
a housing having
a first housing section
and a second housing section,
said first and second housing sections being secured together to define a valve chamber,
said housing further having
an inlet for air flow into said valve chamber and an outlet for air flow out of said valve chamber,
said outlet being adapted to be connected to a vacuum source such as the intake of an internal combustion engine
and said inlet being adapted to be connected to a vacuum powered device such as a vacuum suspended power brake booster;
a poppet type check valve member received in said valve chamber, said check valve member comprising
a rigid valve member body having
a disc-like center section,
a first stem extending axially from one side of said center section and forming a first guided valve portion,
a second stem extending axially from the other side of said center section and forming a second guided valve portion,
an annular valve seal secured to the peripheral portion of said disc-like center section of said valve body,
one side of said annular valve seal having a valve seat-engageable surface, said seal being made of a rubber-like flouro-silicone material and being molded on said valve body disc-like center section so as to circumferentially enclose the outer periphery thereof and provide said seat-engaging surface;
said valve housing having
a recessed opening in one of said housing sections receiving said first guided valve portion therein for guided reciprocal movement,
a web in the other of said housing sections formed to extend into said valve chamber, said web having a center part in axial alignment with said inlet and with said recessed opening, said web center part having an opening formed axially therethrough and receiving said second guided valve portion therein for guided reciprocal movement,
an annular valve seat formed as a part of said other housing section and extending about said inlet toward said valve chamber, said annular valve seat being sealingly engageable with said annular valve seal seat-engageable surface;
one of said valve seal and said valve seat having annular bead means formed thereon for engaging the other of said valve seal and said valve seat in sealing relation with minimal effective contact area;
and a valve spring in said valve chamber acting on said valve member and continually urging said valve seal toward sealing engagement of said valve seal with said valve seat;
said rigid valve member body providing reinforcement for said valve seal to insure planar sealing action with said valve seat;
said poppet valve guide stems and openings cooperating to maintain said valve member in sufficient axial alignment so that said valve seal and said valve seat are in engageable axial alignment, said guide stems and openings and the reinforcing of said valve seal by said disc-like section cooperating to maintain said seat-engageable surface and said seat in parallel planar relation to prevent leakage therebetween when said seal surface and said seat are in closed valve engagement;
said valve seal being a rubber-like material having a durometer of about 40 to 50 at about 70° F. and increasing in durometer with a decrease in ambient temperature to no more than about 60 to 70 durometer at about minus 20° F. so as to substantially eliminate cold weather sticking of said valve seal to said valve seat under cold weather conditions while maintaining good sealing characteristics;
said valve spring having a spring rate cooperating with the large effective area of said valve member in relation to the minimal effective contact area of the sealing engagement of said valve seal with said valve seat to permit a low pressure differential acting across said valve member to open said valve member relative to said valve seat and permit flow through said check valve assembly, said low pressure differential being about 1 inch of mercury differential pressure acting across said valve member;
said valve assembly when opening providing an average flow restriction therethrough on the order of about 2 to 4 inches of mercury at an average flow rate of about 500 cubic feet per hour.

3. In a vacuum check valve assembly:
a housing having
a first housing section
and a second housing section,
said first and second housing sections being secured together to define a valve chamber,
said housing further having
an inlet for air flow into said valve chamber and an outlet for air flow out of said valve chamber,
said outlet being adapted to be connected to a vacuum source such as the intake of an internal combustion engine
and said inlet being adapted to be connected to a vacuum powered device such as a vacuum suspended power brake booster;
a poppet type check valve member received in said valve chamber, said check valve member comprising a rigid valve member body having
a disc-like center section,
a first stem extending axially from one side of said center section and forming a first guided valve portion and
a second stem extending axially from the other side of said center section and forming a second guided valve portion,
an annular valve seal secured to the peripheral portion of said disc-like center section of said valve body,
one side of said annular valve seal having a valve seat-engageable surface
said valve housing having
a recessed opening in one of said housing sections receiving said first guided valve portion therein for guided reciprocal movement,
a web in the other of said housing sections formed to extend into said valve chamber, said web having a center part in axial alignment with said inlet and with said recessed opening, said web center part having an opening formed axially therethrough and receiving said second guided valve portion therein for guided reciprocal movement,
an annular valve seat formed as a part of said other housing section and extending about said inlet toward said valve chamber, said annular valve seat being sealingly engageable with said annular valve seal seat-engageable surface;
said valve guide stem and associated guide opening on one side of said valve disc-like center section having larger diameters than the valve guide stem and associated guide opening on the other side of said valve disc section and thus preventing assembly of said valve member in said valve chamber in the axially reversed position;
one of said valve seal and said valve seat having annular bead means formed thereon for engaging the other of said valve seal and said valve seat in sealing relation with minimal effective contact area;
and a valve spring in said valve chamber acting on said valve member and continually urging said valve seal toward sealing engagement of said valve seal with said valve seat;
said rigid valve member body providing reinforcement for said valve seal to insure planar sealing action with said valve seat;
said valve seal being a rubber-like material having a durometer of about 40 to 50 at about 70° F. and increasing in durometer with a decrease in ambient temperature to no more than about 60 to 70 durometer at about minus 20° F. so as to substantially eliminate cold weather sticking of said valve seal to said valve seat under cold weather conditions while maintaining good sealing characteristics;
said valve spring having a spring rate cooperating with the large effective area of said valve member in relation to the minimal effective contact area of the sealing engagement of said valve seal with said valve seat to permit a low pressure differential acting across said valve member toward said outlet to open said valve member relative to said valve seat and permit flow through said check valve assembly, said low pressure differential being about 1 inch of mercury differential pressure acting across said valve member;
said valve assembly when opening providing an average flow restriction therethrough on the order of about 2 to 4 inches of mercury at an average flow rate of about 500 cubic feet per hour.

4. For use in a motor vehicle having an engine provided with an intake manifold receiving fuel and air for the engine and also acting as a source of vacuum for operation of certain accessories including a vacuum suspended power brake booster, said booster having a vacuum conduit connecting the vacuum chamber means of the booster with the intake manifold and also having a normally closed vacuum check valve permitting air to flow from said booster to said intake manifold through said vacuum conduit when a pressure differential acting across said check valve toward the engine intake manifold opens said check valve, said check valve preventing flow of air through said check valve in either direction when said check valve is closed, an improved vacuum check valve and vacuum supply arrangement comprising:
said check valve assembly including a housing having a valve chamber and an inlet connectable to said booster and an outlet connectable to said engine intake manifold via the vacuum conduit, a valve seat in said valve chamber formed on a part of said housing and positioned in axial alignment with said housing inlet, a poppet valve member in said valve chamber having an axially extending guide stem cooperating with axially aligned openings in said valve housing to guide and maintain said valve member in operative alignment with said valve seat for full sealing engagement and disengagement therewith, said poppet valve member being peripherally spaced within said valve chamber relative to said housing so as to allow substantially unrestricted air flow past said poppet valve member when said check valve assembly is open, spring means continuously urging said poppet valve member toward sealing engagement with said valve seat, said valve member having a rubber-like valve seal and a valve member body including a disc-like section mounted on said valve guide stem in planar parallel relation with said valve seat, said disc-like section receiving and supporting said valve seal and reinforcing said valve seal against distortion relative to said valve seat to insure full sealing engagement between said valve seal and said valve seat;
said check valve assembly and said vacuum conduit permitting air flow therethrough with an average valve assembly flow restriction of about 2 to 3 inches of mercury at an average flow rate of 500 cubic feet of air per hour after said valve member is moved from said valve seat to open said valve assembly at an average opening pressure differential of about 0.5 to 1.0 inches of mercury;
said rubber-like valve seal having a durometer of about 40 to 50 at 70° F. and increasing to no more than about 60 to 70 durometer at minus 20° F., thereby being substantially free of sticking under such cold temperature conditions while having continuous full sealing capability throughout a temperature range of about 280° F. to minus 40° F.

5. A vacuum check valve for use in a vacuum suspended power brake booster receiving vacuum pressure from an engine intake manifold, said vacuum check valve comprising:
a housing having an inlet port, an annular valve seat formed about said inlet port, an outlet port having about the same effective cross-section area as said inlet port, a valve chamber connecting said inlet port and said outlet port and having said valve seat therein, and axially aligned valve support and guide means formed as a part of said housing in axial alignment with said valve seat;

a valve member and a valve spring in said valve chamber, said valve member being mounted for reciprocal guided axial movements in said axially aligned valve support and guide means for full sealing engagement and full disengagement with said valve seat and being continuously urged toward said valve seat by said valve spring, said valve member having a valve seat contact surface made of a material which changes in durometer with a temperature change from about 70° F. to about minus 20° F. by no more than about 35% so as to minimize valve-to-valve seat sticking throughout the operating temperature range of the valve of 280° F. to minus 40° F., the area of sealing engagement contact between said valve member and said valve seat being annular substantially line contact;

the area of said valve member subject to pressure differentials between said inlet port and said outlet port being at least the full effective cross-section area of said inlet port, the relative sizes of said areas, the minimal valve sticking characteristic of said valve member valve seat contact surface and the spring rate of said valve spring acting in combination being such that the sensitivity of response of said valve member to such pressure differentials throughout said operating temperature range is such that said valve member will move from full sealing engagement with said valve seat to a substantially full flow open position when said pressure differential acting toward said engine intake manifold is less than one inch of mercury;

and the annular area defined by the valve member periphery and the valve housing radially outward thereof being at least as great as the effective cross-section area of said inlet port so as to provide minimal restriction to air flow past said valve member when said valve is open, the restriction to flow of air through said valve at an average measured flow rate of 500 cubic feet per hour being no more than about 3 inches of mercury, and being less at lesser average flow rates.

* * * * *